US009946515B2

(12) United States Patent
Vellore et al.

(10) Patent No.: US 9,946,515 B2
(45) Date of Patent: Apr. 17, 2018

(54) METHODS AND APPARATUS FOR DESIGNING DEVICE-TO-DEVICE CONFIGURATIONS SUITABLE TO BE USED IN A POWER SYSTEM

(75) Inventors: Jay Vellore, Breinigsville, PA (US);
David Lubkeman, Cary, NC (US);
James Stoupis, Durham, NC (US);
Donato Colonna, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 1412 days.

(21) Appl. No.: 12/937,922

(22) PCT Filed: Apr. 9, 2009

(86) PCT No.: PCT/US2009/040100
§ 371 (c)(1),
(2), (4) Date: Jan. 12, 2011

(87) PCT Pub. No.: WO2009/129122
PCT Pub. Date: Oct. 22, 2009

(65) Prior Publication Data

US 2011/0098988 A1    Apr. 28, 2011

Related U.S. Application Data

(60) Provisional application No. 61/046,051, filed on Apr. 18, 2008.

(51) Int. Cl.
*G06G 7/48*    (2006.01)
*G06G 7/62*    (2006.01)
(Continued)

(52) U.S. Cl.
CPC .............. *G06F 8/34* (2013.01); *H02J 13/001* (2013.01); *Y02E 60/724* (2013.01); *Y04S 10/18* (2013.01); *Y04S 10/40* (2013.01)

(58) Field of Classification Search
None
See application file for complete search history.

(56) References Cited

U.S. PATENT DOCUMENTS

2006/0116794 A1*  6/2006  Stoupis et al. ................ 700/286
2006/0294505 A1   12/2006  Englehart
2008/0040703 A1    2/2008  Englehart

FOREIGN PATENT DOCUMENTS

WO        2006060371 A2    6/2006

OTHER PUBLICATIONS

Naodovic, B. "Influence of Instrument Transformers on Power System Protection", May 2005, 142 pages.*

(Continued)

*Primary Examiner* — Suzanne Lo
(74) *Attorney, Agent, or Firm* — Taft Stettinius & Hollister LLP

(57) ABSTRACT

Graphical tool and method for designing device-to-device configurations used in power systems. The tool comprises software program instructions configured to allow a user to graphically associate on a monitor an intelligent electronic device (IED) selected from an available list to a corresponding switching device of the power system. For a first IED associated to corresponding switching device, the user graphically configures on the monitor a related logic by selecting one or more logical inputs/outputs and one or more target IEDs from/to which said logical inputs/outputs are to be received/sent, respectively.

24 Claims, 4 Drawing Sheets

(51) Int. Cl.
*G06F 9/44* (2018.01)
*H02J 13/00* (2006.01)

(56) References Cited

OTHER PUBLICATIONS

Mathworks, "Using Simulink Version 6", 2005, 711 pages.*
The Patent Office of the People's Republic of China, Office Action for corresponding Chinese patent application No. CN200980113363.3, dated Oct. 22, 2012.
Qiuling Jia, Dongli Yuan, Yunfeng Luan, "MATLAB 7.x/Simulink/ Stateflow Based System Simulation, Analysis and Design," Jun. 2006, pp. 61-80, Northwestern Polytechnical University Press.
International Searching Authority (EPO), International Search Report and Written Opinion of the International Searching Authority for International Application No. PCT/US2009/040100, dated Sep. 9, 2009, European Patent Office.
The MathWorks, Simulink 7—Using Simulink, Sep. 2007, Chapters 3, 5, 7 and 11, The MathWorks, Natick, MA.
G. Desantis, Reply to Communication pursuant to Rules 161 (1) and 162 EPC in corresponding European Application No. 09732209.3, dated Feb. 17, 2011.
G. Rackl, Examining Division of the European Patent Office, Communication pursuant to Article 94(3) EPC in corresponding European Application No. 09732209.3, dated Jul. 27, 2011.
G. Desantis, Reply to Communication pursuant to Article 94(3) EPC in corresponding European Application No. 09732209.3, dated Nov. 23, 2011.
King & Wood Mallesons, Response to Office Action dated Aug. 29, 2013 for corresponding Chinese patent application No. 200980113363.3, dated Jan. 13, 2014.
Steven Hudnut, Instructions and Claims for Response to Office Action dated Aug. 29, 2013 for corresponding Chinese patent application No. 200980113363.3.
King & Wood Mallesons, Response to Office Action dated Oct. 22, 2012 for corresponding Chinese patent application No. 200980113363.3, dated May 6, 2013.
Steven Hudnut, Instructions and Claims for Response to Office Action dated Oct. 22, 2012 for corresponding Chinese patent application No. 200980113363.3.
The Patent Office of the People's Republic of China, Office Action for corresponding Chinese patent application No. 200980113363.3, dated Aug. 29, 2013.
The State Intellectual Property Office of the People's Republic of China, Office Action dated May 15, 2014 for corresponding Chinese patent application No. 200980113363.3.
Steven Hudnut, Instructions and Claims for Response to Office Action dated May 15, 2014 for corresponding Chinese patent application No. 200980113363.3, dated Sep. 19, 2014.

* cited by examiner

METHODS AND APPARATUS FOR DESIGNING DEVICE-TO-DEVICE CONFIGURATIONS SUITABLE TO BE USED IN A POWER SYSTEM

CROSS REFERENCE TO RELATED APPLICATIONS

This application is a 35 U.S.C. § 371 national stage filing of International Application No. PCT/US2009/040100, filed Apr. 9, 2009, which claimed the benefit of and priority to U.S. Provisional Patent Application Ser. No. 61/046,051, filed Apr. 18, 2008. The complete disclosures of the above-identified patent applications are hereby incorporated by reference for all purposes.

BACKGROUND OF THE INVENTION

The present invention relates to a method and apparatus for designing device-to-device configurations suitable to be used in a power system.

As it is known, power systems for transmitting and distributing electricity from power sources to various loads and users are equipped with several types of electrical equipments, typically switching devices such as circuit breakers and reclosers, which are adapted for ensuring a proper functioning of an associated power line and of loads/users connected therewith.

To this end, the latest advancements in microprocessor-based devices and digital signal processing technologies have led to the proliferation of electronic devices, usually referred to as intelligent electronic devices (IEDs).

An IED by definition is a microprocessor-based device, typically a controller relay, which is provided with one or more communications ports and is operatively coupled to an associated switching device in order to perform various protection, control and monitoring tasks.

In recent years, the use of IEDs in power systems has dramatically increased. Since users deal with a large variety of possible network topologies for power systems, correspondingly large is the amount and variety of IEDs devised for different purposes and offered by different manufacturers to be used in each specific network topology. As a consequence, the amount of information that needs to be known and handled by users becomes overwhelming.

In particular, the configuration of each IED and of the operative relationship and coordination among the various IEDs to be installed in a network topology can be extremely difficult and would require in most cases an extensive use of engineering experts.

Therefore, it would be desirable to provide a solution which substantially eases the design of IED-to-IED configurations in power systems. This solution is provided by the method and apparatus of the present invention.

SUMMARY OF THE INVENTION

In accordance with the present invention, there is provided a graphical tool for designing device-to-device configurations suitable to be used in a power system comprising a plurality of electrical switching devices, said graphical tool comprising a computer-readable medium having stored thereon software program instructions which when executed by a processor cause the display of a graphical interface unit (GUI) on a monitor, wherein said software program instructions comprise code configured to perform a method comprising:

upon representation on said monitor of a network topology for said power system and of a list of available intelligent electronic devices (IEDs), graphically associating on said monitor an intelligent electronic device (IED) selected from said list of available IEDs to a corresponding switching device of said plurality of switching devices, wherein at least two switching devices of said plurality of switching devices are associated each with a corresponding IED selected from said list; and for each IED associated to a corresponding switching device of said power system, graphically configuring on the monitor a logic by selecting one or more logical inputs and/or outputs and one or more target IEDs each associated to another one of said plurality of switching devices other than said corresponding switching device from/to which said logical inputs and/or outputs are to be received/sent, respectively.

Also provided in accordance with the present invention is a method for designing device-to-device configurations suitable to be used in a power system comprising a plurality of electrical switching devices, the method comprising:

upon representation on a monitor of a network topology for said power system and of a list of available intelligent electronic devices (IEDs), graphically associating on said monitor an intelligent electronic device (IED) selected from said list of available IEDs to a corresponding switching device of said plurality of switching devices, wherein at least two switching devices of said plurality of switching devices are associated each with a corresponding IED selected from said list; and for each IED associated to a corresponding switching device of said power system, graphically configuring on the monitor a logic by selecting one or more logical inputs and/or outputs and one or more target IEDs each associated to another one of said plurality of switching devices other than said corresponding switching device from/to which said logical inputs and/or outputs are to be received/sent, respectively.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
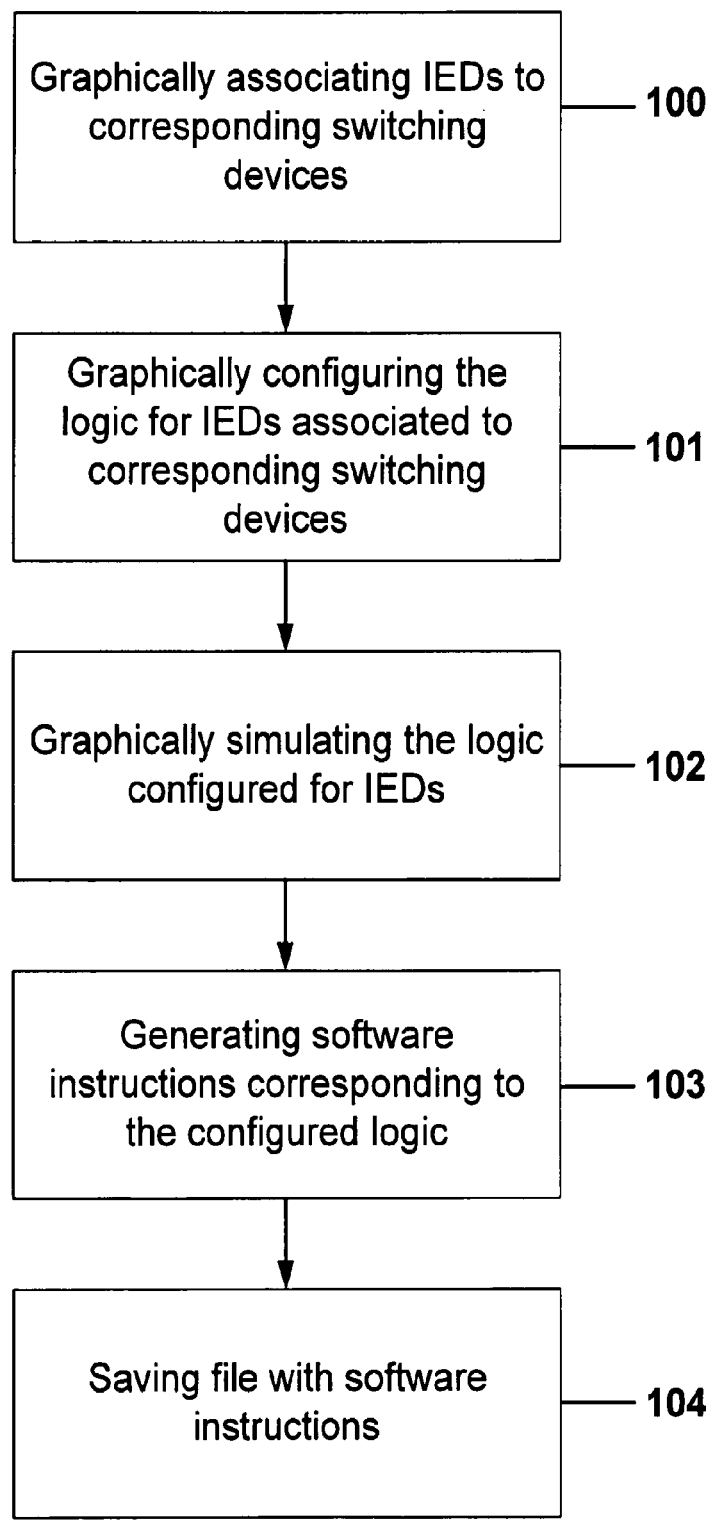
FIG. 1 is a flow chart illustrating a method for designing device-to-device configurations suitable to be used in power systems in accordance to the present invention.

It should be noted that in the detailed description that follows, identical or functionally equivalent components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 4:
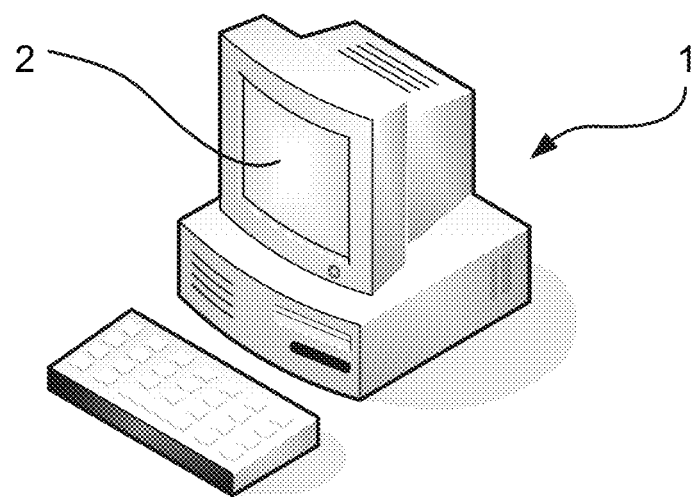
FIG. 4 schematically shows a computing device.

The graphical tool according to the present invention comprises a computer-readable medium having stored thereon software program instructions which can be executed by any suitable processor of a computing device an exemplary embodiment of which is schematically represented in FIG. 4 by the reference number 1. In particular, in the graphical tool according to the invention, the software program instructions when executed by the processor of the computing device 1 cause the display of a graphical interface unit (GUI) on the monitor 2.

Figure 2:
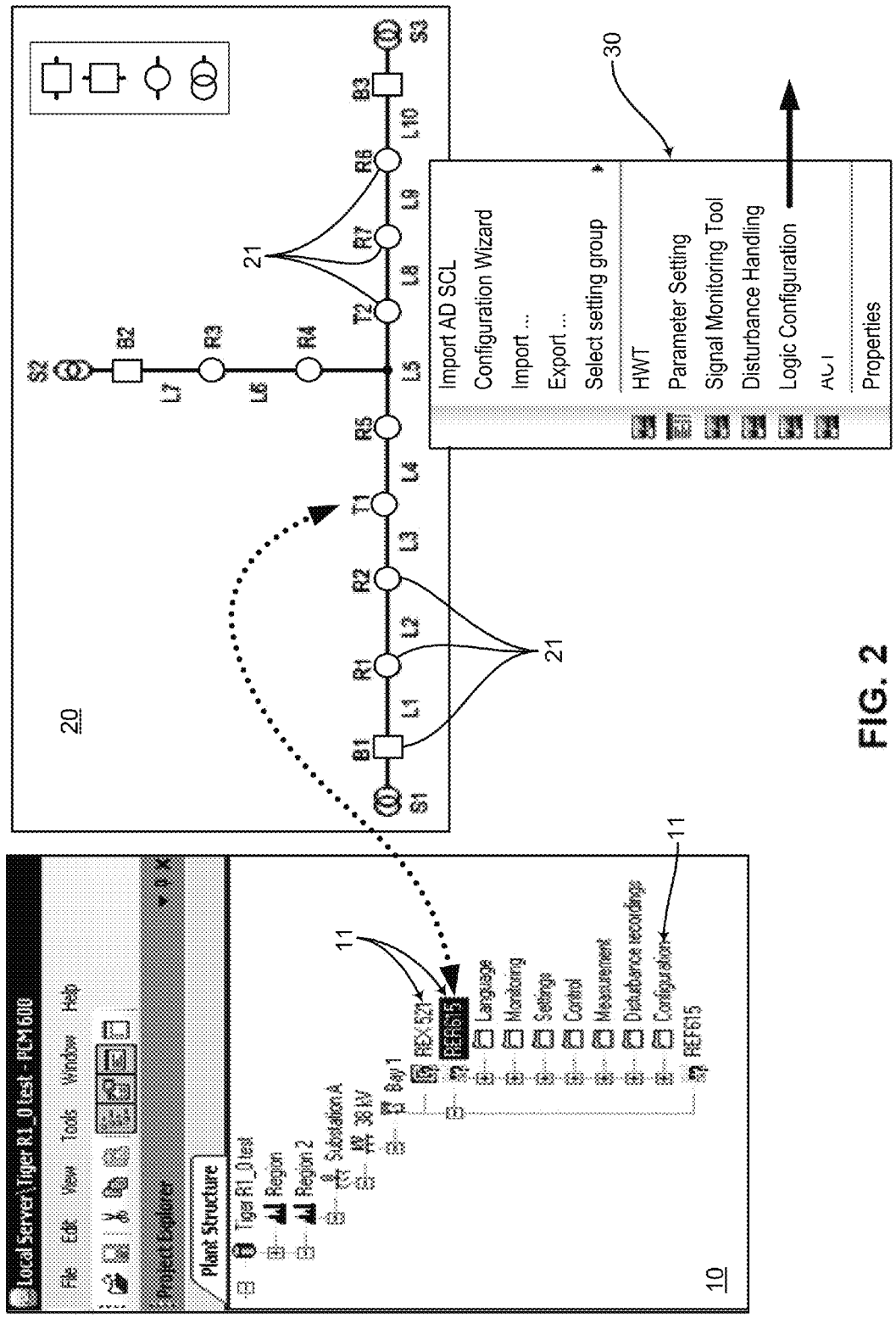
FIG. 2 illustrates a screenshot of a graphical interface unit (GUI) which is displayed on a monitor when a software program instruction of the graphical tool according to the invention is executed by a processor.

Preferably, as illustrated in FIG. 2, the software program instructions when executed by the processor cause the display at the same time on the monitor 2 of two separate portions or windows, namely a first portion 10 indicated as the "Fleet View" inside which a list of available Intelligent Electronic Devices (IEDs) can be represented and a second portion 20, indicated as the "System View" inside which a network topology for a power system can be represented. The "System View" and the "Fleet View" are operatively linked to each other.

In particular, the software program instructions of the graphical tool according to the invention comprise code configured to allow a user to set, either on-line or off-line, a desired list of available IEDs or edit a preset list of available IEDs within the first portion 10. For example, upon launching the graphical tool, the user can be initially presented with an empty first portion 10 inside which it can add a desired list of IEDs available from any possible source, such as catalogues, SCL, etc. Alternatively, the user can be presented with a preset and modifiable list of available IEDs which can be used as it is or can be modified by adding one or more IEDS or replacing existing IEDs with new ones.

Further, the software program instructions comprise code configured to allow a user to draw a desired network topology for the power system or to show a modifiable network topology for the power system within the second portion 20. In particular, the graphical tool according to the present invention preferably comprises a library having one or more templates each corresponding to a predefined network topology for a power system.

Hence, upon launching the graphical tool, the user can be initially presented with an empty second portion 20 of the screen inside which it can draw a desired network topology. For instance, the user can insert the network topology into the System View portion for example by dragging and dropping the symbols corresponding to various equipment, such as B for breakers, R for reclosers, S for substations etc. and then designing the connections by drawings the various sections L1-Ln of the connecting power network. Alternatively, the user can select one existing network topology from the library and can use the selected topology as already drawn or can modify it according to the specific needs. Once designed, the power system topology is automatically translated into an internal format, e.g. connection matrix, by the software of the graphical tool.

FIG. 2 illustrates a possible example of a network topology for a power system comprising a plurality of switching devices 21, such as reclosers, circuit breakers, which are positioned along the various segments L1-L7 of the power network and are indicated by the various symbols B1, B2, B3, R1-R7, T1, T2 etc. As it will be appreciated by the skilled in the art, the graphical tool according to the invention can be used for designing IED-to-IED configurations suitable to be used in any type of power system topologies and can be advantageously used for example to configure simple loop or more complex multi-back feed schemes of feeder and/or substation automation systems, etc.

Upon representation on the monitor 2 of a desired network topology for a power system and of the list of available intelligent electronic devices (IEDs), at step 100 a user graphically associates—directly on the monitor 2 and by means of the GUI—an intelligent electronic device (IED) 11 selected from the list of available IEDs 11 to a corresponding switching device 21 of the plurality of switching devices. In particular, the user associates at least two switching devices 21, each with a corresponding IED 11 selected from the available list. Preferably all switching devices 21 located into the network topology of the power system are each associated to a corresponding IED 11 of the available list. The same type of IED 11 can be associated with more than one switching device 21.

The graphical association between an IED 11 and a corresponding switching device 21 is for example accomplished by the user simply by transferring, e.g. dragging and dropping, a graphical symbol representing the selected IED 11 from the "Fleet View" (first portion or window 10) into the "System View" (second portion or window 20) at the location of the associated switching device 21.

As illustrated in FIG. 1, at step 101, for each IED 11 associated to a corresponding switching device 21 of the power system, the user graphically configures on the monitor 2 a respective logic. In particular, the graphical tool of the present invention comprises code configured to allow a user to select each IED 11 associated to a corresponding switching device and edit, for example by simply clicking on the relative symbol, a menu or option screen 30 illustrated in FIG. 2. As schematically shown, the menu 30 comprises a list of selectable options, such as parameter setting for setting various parameters, Disturbance Handling, Logic Configuration. Clearly, other options can be made available for the menu or option screen 30. In general, all the sub-tools available for each IED 11 can be launched in this way in the System View.

Figure 3:
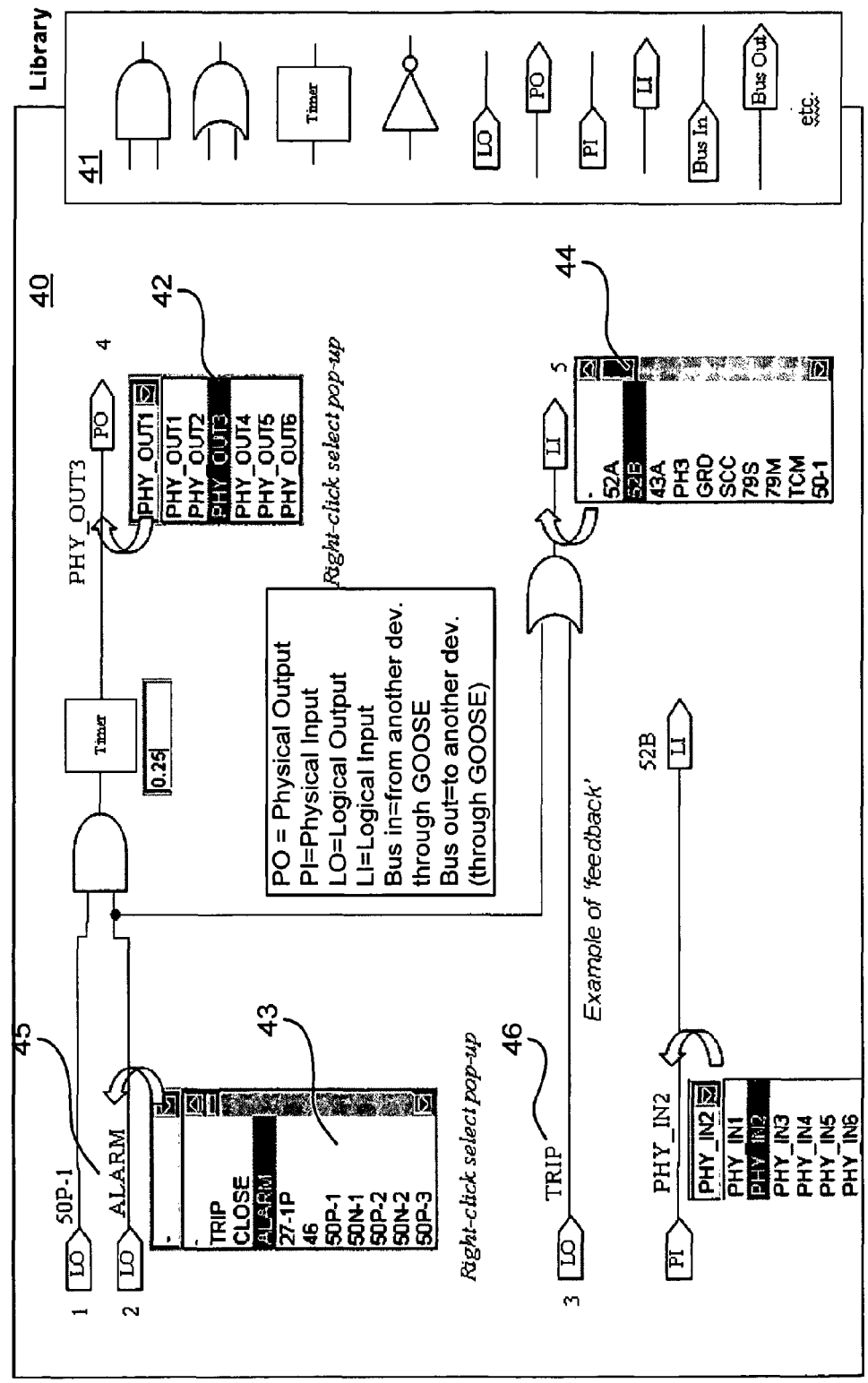
FIG. 3 shows a screenshot displayed on a monitor at a step when a logic for a selected IED associated to a corresponding switching device of a power system is under configuration.

Once the user has selected a first IED 11 and for this IED launches the option Logic Configuration, a related window 40 is opened on the monitor 2, as illustrated for example in FIG. 3. As shown, for the first selected IED 11 the user selects one or more logical inputs that the selected first IED 11 should receive and/or one or more logical outputs that the selected first IED 11 should output. In particular, the graphical tool comprises a dedicated library 41 comprising at least a plurality of graphical symbols corresponding to available types of logical inputs/outputs, logical operators etc. In practice, from the pop-up windows 42-44 the user can select the various types of inputs/outputs for the first selected IED 11, such as an alarm logical output (LO) 45, a trip logical output (LO) 46, a logical input (LI) 52B, etc. The various logical inputs/outputs are operatively associated to each other by drawing the desired logic using the various symbols available, such as AND/OR operators. Further, each logical input and output is then associated to a corresponding physical input/output (PHY_IN/PHY_OUT) of the first selected IED 11.

In addition, among the others IEDs associated to other switching devices 21 of the power system drawn, the user selects also the target IEDs from/to which the logical inputs and/or logical outputs are to be received/sent, respectively. In particular, the user draws the various operative connections among the various IEDs first by graphically associating the various logical inputs and outputs for the selected first IED to available communication buses for inputting (BUS In) the selected logic signals into the selected first IED 11 or for outputting (Bus Out) from the selected IED 11 the designed logical outputs and making them available to other IEDs. Then, the Bus In and Bus Out communication buses are graphically connected to the target IEDs 11 which are capable to receive of provide the designed inputs/outputs. When performing this configuration, and in particular in selecting the logical inputs, the user can right click and launch a wizard that helps viewing the available signals from all the IEDs listed in the Fleet View.

This configuration can be executed by the user for many, preferably all the IEDs 11 associated each to a corresponding switching device 21 of the drawn power system.

Once the configuration is completed, the program instructions further comprise code configured to allow the user (step 102) to graphically simulate on the monitor 2 the logic graphically configured for the various IEDs associated each to a corresponding switching device 21 of the power system. For example, the user can set and graphically simulate a fault location on the power system and the basic fault data and then can check how the system evolves according to the logic programmed for the various IEDs configured.

When the logic programmed performs as desired, the software program instructions further comprise code configured to automatically generate (step 103) software instructions corresponding to the logic graphically configured for each IED 11 associated to a corresponding switching device. In particular, the software configurations are generated at least on the basis of one or more settings of the target IEDs selected for each IED 11, such as address, protocol to be used for the connections and related parameters etc.

Further, at step 104, for each of the IED configured and associated to a corresponding switching device 21, a file containing the generated software instructions is saved on a suitable storing unit, e.g. a memory of the computing device 1. This file can be downloaded on the field application directly into the corresponding real IED.

Thanks to the tool and method of the present invention, users can therefore save valuable time and reduce the risk of mistakes during configurations of IED-to-IED connections that could result in costly outages later on. Indeed, the tool isolates users from the details of the communication protocol and hardware. To this end, the tool according to the invention can be used preferably with protocol IEC 61850 GOOSE; however, other communication protocols could be likewise used.

As will be appreciated by one of ordinary skill in the art, the present invention may be embodied as or take the form of the method and tool previously described, as well as of a computer readable medium having computer-readable instructions stored thereon which, when executed by a processor, carry out the operations of the present inventions as previously described and defined in the corresponding appended claims. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A graphical tool for designing device-to-device configurations for intelligent electronic devices (IEDs) in a power system that comprises a plurality of electrical switching devices, said graphical tool comprising a non-transitory computer-readable medium having stored thereon software program instructions which when executed by a processor cause the display of a graphical interface unit (GUI) on a monitor, wherein said software program instructions comprise code configured to perform a method comprising:

upon representation on said monitor of a network topology for said power system and a list of available IEDs, graphically associating on said monitor an IED selected from said list of available IEDs with a corresponding switching device of said plurality of switching devices, wherein at least two switching devices of said plurality of switching devices are each associated with an IED selected from said list of available IEDs; and designing at least one IED-to-IED configuration for each IED associated with a corresponding, switching device of said plurality of switching devices by graphically configuring on the monitor a logic for the IED, wherein graphically configuring on the monitor a logic for the IED comprises:

graphically selecting for the IED one or more logical inputs and/or outputs, graphically selecting for the IED one or more target IEDs from/to which said logical inputs and/or outputs are to be received/sent, respectively, wherein each of the one or more target IEDs selected for the IED is associated with another one of said plurality of switching devices other than the corresponding switching device that is associated with the IED, graphically associating said one or more-logical inputs and/or outputs selected for the IBD to one or more available communication buses, and graphically connecting the one or more available communication buses to the one or more target IEDs selected for the IED;

automatically generate software instructions corresponding to the at least one IED-to-IED configuration designed by the graphical tool for the one or more target IEDs for a real IED;

downloading the software instructions to the real IED.

2. The graphical tool of claim 1 wherein said software program instructions further comprise code configured to:

graphically simulate on said monitor the logic graphically configured for the IED.

3. The graphical tool of claim 1 wherein said software program instructions further comprise code configured to:

save, for the IED, a file containing. said automatically generated software instructions for the IED.

4. The graphical tool of claim 1 wherein it comprises a library comprising at least a plurality of graphical symbols corresponding to available types of logical input and outputs.

5. The graphical tool of claim 1 wherein it comprises a library comprising one or more templates each corresponding to a predefined network topology for a power system.

6. The graphical tool of claim 1 wherein said software program instructions when executed by a processor cause the display at the same time on said monitor of a first portion and of a second portion inside which said list of available IEDs and said network topology for the power system are shown, respectively, wherein said network topology comprises said plurality of switching devices.

7. The graphical tool of claim 6 wherein graphically associating on said monitor an IED selected from said list of available IEDs with a corresponding switching device of said plurality of switching devices comprises transferring a graphical symbol representing the selected IED from said list in said first portion into said second portion at a location of the corresponding switching device.

8. The graphical tool of claim 1 wherein said software program instructions further comprise code configured to:
  select each IED associated with a corresponding switching device and edit a menu comprising one or more selectable options for each IED selected.

9. The graphical tool of claim 6 wherein said software program instructions comprise code configured to:
  set a desired list of available IEDs or edit a modifiable preset list of available IEDs within said first portion.

10. The graphical tool of claim 6 wherein said software program instructions further comprise code configured to:
  draw a desired network topology for said power system or show a modifiable network topology for said power system within said second portion.

11. A method for designing device-to-device configurations for intelligent electronic devices (IEDs) in a power system that comprises a plurality of electrical switching devices, the method comprising:
  upon, representation on a monitor of a network, topology for said power system and a list of available IEDs, graphically associating on said monitor an IED selected from said list of available IEDs with a corresponding switching device of said plurality of switching devices, wherein at least two switching devices of said plurality of switching devices are each associated with an IED selected from said list of available IEDs; and
  designing at least one IED-to-IED configuration for each IED associated with a corresponding switching device of said plurality of switching devices by graphically configuring on the monitor a logic for the IED, wherein graphically configuring on the monitor a logic for the IED comprises:
    graphically selecting for the IED one or more logical Inputs and/or outputs,
    graphically selecting for the IED one or more: target IEDs from/to which said logical inputs and/or outputs are to be received/sent, respectively, wherein each of the one or more target IEDs selected for the IED is associated with another one of said plurality of switching devices other than the corresponding switching device that is associated with the IED,
    graphically associating said one or more logical inputs and/or outputs selected for the IED to one or more available communication buses,
    graphically connecting the one or more available communication buses to the one or more target IEDs selected for the IED;
  automatically generate software instructions corresponding to the at least one IED-to-IED configuration designed by the graphical tool for the one or more target IEDs for a real IED; and
  downloading the software instructions to the real IED.

12. The method of claim 11 wherein it further comprises:
  graphically simulating on said monitor the logic graphically configured for the IED.

13. The method of claim 11 wherein it further comprises:
  saving, for the IED, a file containing said automatically generated software instructions.

14. The method of claim 11 wherein it further comprises:
  editing a library comprising at least a plurality of graphical symbols corresponding to available types of logical input and outputs.

15. The method of claim 11 wherein it further comprises:
  editing a library comprising one or more templates each corresponding to a predefined network topology for a power system.

16. The method of claim 11 wherein it further comprises:
  displaying at the same time on said monitor a first portion and a second portion inside which said list of available IEDs and said network topology for the power system are shown, respectively.

17. The method of claim 16 wherein:
  graphically associating on said monitor an IED selected from said list of available IEDs with a corresponding switching device of said plurality of switching devices comprises transferring a graphical symbol representing the selected IED from said list in said first portion into said second portion at a location of the corresponding switching device.

18. The method of claim 11 wherein it further comprises:
  selecting each IED associated with a corresponding switching device and editing a menu comprising one or more selectable options for each IED selected.

19. The method of claim 16 wherein it further comprises:
  setting a desired list of available IEDs or editing a modifiable preset list of available IEDs within said first portion.

20. The method of claim 16 wherein it further comprises:
  drawing a desired network topology for said power system or showing a modifiable network topology for said power system within said second portion.

21. A non-transitory computer readable medium having computer-readable instructions stored thereon for execution by a microprocessor to perform a method for designing device-to-device configurations for intelligent electronic devices (IEDs) in a power system that comprises a plurality of electrical switching devices, said method comprising:
  upon representation on a monitor of a network topology for said power system and a list of available IEDs, graphically associating on said monitor an IED selected from said list of available IEDs with a corresponding switching device of said plurality of switching devices, wherein at least two switching devices of said plurality of switching devices are each associated with an IED selected from said, list of available IEDs; and
  designing at least one IED-to-IED configuration for each IED associated with a corresponding switching device of said plurality of switching devices by graphically configuring on the monitor a logic for the IED, wherein graphically configuring on the monitor a logic for the IED comprises:

graphically selecting for the IED one or more logical inputs and/or outputs, graphically selecting for the IED one or more target IEDs from/to which said logical inputs and/or outputs are to be received/sent, respectively, wherein each of the one or more target IEDs selected for the IED is associated with another one of said plurality of switching devices other than the corresponding switching device that is associated with the IED, graphically associating said one or more logical inputs and/or outputs selected for the IED to one or more available communication buses, graphically connecting the one or more available communication buses to the one or more target IEDs selected for the IED;

automatically generate software instructions corresponding to the at least one IED-to-IED configuration designed by the graphical tool for the one or more target IEDs for a real IED; and downloading the software instructions to the real IED.

22. The graphical tool of claim 1 wherein said list of available IEDs comprises a list of different types of IEDs.

23. The graphical tool of claim 1 wherein the method comprises:
selecting additional IEDs from said list of available IEDs;
graphically associating on said monitor the additional IEDs each with a remaining one of said plurality of switching devices until each one of said plurality of switching devices is associated with one of the IEDs; and
designing at least one IED-to-IED configuration for each of the additional IEDs by graphically configuring on the monitor a logic for each of the additional IEDs.

24. The method of claim 11 wherein graphically configuring on the monitor a logic for the IED comprises operatively associating on the monitor said one or more logical inputs and/or outputs selected for the IED by drawing a desired logic using graphical symbols corresponding to available types of logical inputs and/or outputs for the IED.

* * * * *